United States Patent [19]
Felger

[11] Patent Number: 5,960,069
[45] Date of Patent: Sep. 28, 1999

[54] METHOD OF BILLING A MULTIPLE SERVICE REPRESENTATIVE CONFERENCE CALL

[75] Inventor: David Felger, c/o The National Psychic Association, Inc., Camino Real Centre, 7200 Camino Real, Suite 300, Boca Raton, Fla. 33433

[73] Assignee: David Felger, Boca Raton, Fla.

[21] Appl. No.: 08/757,563

[22] Filed: Nov. 27, 1996

Related U.S. Application Data

[63] Continuation-in-part of application No. 08/658,378, Jun. 5, 1996, Pat. No. 5,802,156.

[51] Int. Cl.$^6$ .................................................. H04M 15/00
[52] U.S. Cl. ......................... 379/114; 379/127; 379/145; 379/144
[58] Field of Search .................................. 379/119, 121, 379/123, 125, 91.01, 111–115, 127, 133–134, 188–189, 194, 201–202, 144

[56] References Cited

U.S. PATENT DOCUMENTS

| | | |
|---|---|---|
| 3,912,874 | 10/1975 | Botterell et al. . |
| 4,823,264 | 4/1989 | Deming . |
| 4,908,850 | 3/1990 | Masson et al. . |
| 4,939,773 | 7/1990 | Katz . |
| 4,943,996 | 7/1990 | Baker, Jr. et al. . |
| 5,003,584 | 3/1991 | Benyacar et al. ........................ 379/119 |
| 5,007,084 | 4/1991 | Materna et al. . |
| 5,023,904 | 6/1991 | Kaplan et al. . |
| 5,210,794 | 5/1993 | Brunsgard . |
| 5,237,159 | 8/1993 | Stephens et al. . |
| 5,283,829 | 2/1994 | Anderson . |
| 5,297,197 | 3/1994 | Katz . |
| 5,351,994 | 10/1994 | Pollin . |
| 5,383,113 | 1/1995 | Kight et al. . |
| 5,442,688 | 8/1995 | Katz . |
| 5,465,206 | 11/1995 | Hilt et al. . |
| 5,467,269 | 11/1995 | Flaten . |
| 5,475,740 | 12/1995 | Biggs, Jr. et al. . |
| 5,475,747 | 12/1995 | Bales et al. . |
| 5,479,510 | 12/1995 | Olsen et al. ........................ 379/91.01 |
| 5,485,370 | 1/1996 | Moss et al. . |
| 5,502,762 | 3/1996 | Andrew et al. . |
| 5,524,142 | 6/1996 | Lewis et al. ........................... 379/114 |
| 5,566,234 | 10/1996 | Reed et al. ........................... 379/91.01 |
| 5,633,919 | 5/1997 | Hogan et al. .......................... 379/115 |

Primary Examiner—Vivian Chang
Assistant Examiner—Duc Nguyen
Attorney, Agent, or Firm—Banner & Witcoff, Ltd.

[57] ABSTRACT

A group conferencing arrangement for a counseling service permits the simultaneous connection of two or more service representatives to a call-in caller, i.e. without the need for one service representative to add-on the second service representative conferee. The call-in caller signifies their wishing to partake in a plural service representative call by dialing a special 800 or 900 telephone number or signifying the same via entering an appropriate response to an audio response unit. Each service representative may have a terminal equipped with a display or other means for receiving the identity of the call-in caller and the other service representative connected to the group conference call. A common controlled automatic call distributor for providing the group conferencing feature preferably includes dual tone multi-frequency receiver/decoder circuits, automatic number identification and dialed number identification circuits, audio response circuits and conference bridge circuits including automatic dialing equipment. In an enhancement, caller preference criteria is matched to service representative data prior to determining service representatives to be connected to the caller. Moreover, calls may be intentionally limited in duration or number to protect the caller, calls may be blocked if certain negative criteria is matched, certain fraud control measures taken in the event the caller is to be billed for the service and form of payment authorization obtained prior to completion of a call.

22 Claims, 3 Drawing Sheets

METHOD OF BILLING A MULTIPLE SERVICE REPRESENTATIVE CONFERENCE CALL

This is a continuation-in-part of U.S. patent application Ser. No. 08/658,378, filed on Jun. 5, 1996, now U.S. Pat. No. 5,802,156.

I. BACKGROUND OF THE INVENTION

A. Technical Field

This invention relates to the field of group telecommunications conference arrangements and, in particular, to a method and apparatus for simultaneously conferencing a caller to plural service representatives, for example, of a psychic counseling network service such as the Yellow Pages Psychic Network (TM) service available from Zodiac Group, Inc. and to call limiting, call blocking, fraud control and payment and billing arrangements therefor. Two or more service representatives can provide better quality service as the caller receives counseling from plural service providers; for example, the caller may receive a second opinion simultaneous with the first and counseling services tailored and pre-selected to their needs.

B. Description of the Related Arts

So-called physic network services have been in operation for several years, conferencing a service representative who may counsel on life, love and prosperity to a call-in caller to an 800 or 900 telephone number. For a nominal per minute fee, the caller can ask any question of the service representative and, generally, the service representative may give counsel to the caller on any aspect of the caller's life. Such a service typically has not involved the ability to provide more than one service representative to assist the caller. Although so-called add-on conferencing is known in the art of private branch exchange systems, the add-on conference has not been used to date by the first service representative in such a service to conference in a second service representative.

Presently, a caller to the Yellow Pages Psychic Network service dials one of a plurality of telephone numbers used to gauge the quality of the advertising source, i.e., where the caller noticed the network service's telephone number. The telephone number connects the caller to the same service bureau where is typically located an automatic call distribution system. The caller hears an announcement regarding costs and charges that may be referred to as a preamble and is then offered to menu to choose from. If one knows the extension number of the service representative that they have used before, they may enter that telephone extension. The caller is also given a choice to listen to brief resumes of the presently available service representatives to serve them and, if the caller decides on a particular psychic, the caller may press the * button to reach that psychic. The caller is in control of the call and can only speak to one psychic in a call.

Billing arrangements in such systems are primitive and may rely on (900) service for the service provider to bill the caller for the call. In an (800) number call, the service provider pays for the call and must assure themselves that payment will be received even more than in a (900) call. The service records credit card or other payment data manually into memory in order to properly bill for the call. Such procedures have led to many callers questioning their bills and in many instances and due to the inefficiencies of the billing procedures, callers have received free calls due to fraudulent payment schemes, improper granting of credit and the like. In a service offered by a company known as Mile High Psychics, credit cards are used for prepayment for blocks of service usage time. Credit authorization is obtained far in advance of a call. For example, the customer may purchase 25 minutes of service in advance of a call and utilize a personal identification number or code (PIN) at the time of their call to access the service.

Automatic call distribution telecommunications equipment is known for providing this service and other services. Common controlled automatic call distribution equipment, for example, is available for purchase from Lucent Technologies, Inc. and other manufacturers of common controlled switching equipment. Typically a service bureau or related organization offers services through a service bureau owned automatic call distribution system. The automatic call distributor channels a call by a call-in caller requesting service to a next available service representative of a service representative availability queue. It is always assumed that one service representative should respond to the call. Service representatives, typically equipped with displays and operator type headsets for hands-free operation, typically consult databases for, for example, making travel reservations. To this end, they may be each provided with access to large computer databases of travel reservation information.

From U.S. Pat. No. 3,912,874, it is generally known to provide two types of conferencing arrangements: a so-called meet-me conference arrangement and a so-called group conferencing arrangement. The present application as well as the '874 patent describe a group conference call. The term "group call" refers to a conference arrangement whereby one party, called the conference originator, initiates action to summon all other conferees. (The meet-me conference relates to a plurality of conferees meeting at a pre-determined time to establish a conference call.) The '874 patent further describes a conference bridge having a conferee port circuit including associated automatic dialing apparatus for initiating calls to conferees in accordance with prearranged programs. Also, the originating port circuit is equipped with a dual tone multi-frequency receiver circuit and decoder circuitry for controlling various modes of operation.

U.S. Pat. No. 4,943,996 solves a problem in a service representative arrangement. Customer service representatives are provided with computer database facilities and display terminals. The agent may view a display of all phone calls waiting to be handled. Customer information may be coordinated for display with a particular call. A caller who joins a call can share information associated with the conference call.

U.S. Pat. No. 5,475,747 describes a "meet-me" conference arrangement. Nevertheless, the problem solved is the need for a display at a terminal of all the names and telephone numbers of participants in the meet-me conference. According to the '747 patent, a telephone terminal stores conferee identification information received from other telephone terminals and is responsive to actuation of an inspect button to display identification information for each conferee. For example, a single-line alphanumeric display can step through the identity of each of the conferees of a conference call.

U.S. Pat. No. 5,502,762 describes a system and method for redirecting a telephone call incoming to a first line to a selected one or ones of second lines and ringing them simultaneously. The problem solved by that invention is that a single telecommunications customer can have multiple numbers, a pager, a cellular phone, a work phone and a home phone, for example. The '762 patent suggests ringing a plurality of such numbers simultaneously under control of a processor in physical proximity to the first telephone.

Ronald A. Katz is believed to hold U.S. Pat. Nos. 4,939,773; 5,297,197 and 5,442,688, all directed to the opposite problem than that solved by the present invention. A plurality of telephone terminals T1 through Tn can be grouped, even pre-determined and preselected to form a group, for conferencing with a single primary telephone terminal Pt. A large number of terminals T can receive communication from the single primary terminal P, for example, the president of a company sending a message to its employees. The terminals T are typically equipped with a keyboard, an earpiece (speaker) and microphone, while the primary terminal may be equipped preferably with a display and controller for controlling the group of terminals T. The equipment may incorporate audio response units for assisting in the call processing by making announcements and providing voice signals to cue and inform.

U.S. Pat. No. 5,475,740 describes a system for enabling user access to and payment for amenities using a telephone for entering billing and amenity identification information connected to a central distribution computer. A billing data base is connected to the central distribution computer for validating entered billing information.

U.S. Pat. No. 5,383,113 and U.S. Patent No. 5,283,829 are both directed to a method for paying bills electronically. According to the '113 patent, a computerized payment system is implemented by which a consumer may instruct a service provider by telephone, computer terminal, or other telecommunications means to pay various bills without the consumer having to write a check for each bill. The service provider collects consumers' information, financial institutions' information and merchant information and arranges payment to the merchants according to the consumer's instructions. Similarly, the 829 patent discloses an electronic bill payment system and method including billing equipment for creating approval records and generating approval numbers for each pre-authorized subscriber. The system also incudes an interactive payment approval apparatus into which subscribes dial to approve payment and which determines, based upon information collected, whether to initiate electronic funds transfer. A series of security checks and comparisons are performed to guard against accidental and malicious entry of approval numbers.

Kaplan et al., U.S. Pat. No. 5,023,904 describes a direct telephone dialing system and method wherein a calling customer can electronically order products and services. An Automatic Number Identification (ANI) for the calling customer is passed on to the system for customer identification and credit verification.

U.S. Pat. No. 4,908,850 describes an information network and method for providing a nationwide audio text network, including electronic billing, useful for a wide variety of applications. The system allows for interactive communication with a computer that supplies the network information to a 1-800 caller. The system is further capable of obtaining electronic credit card authorization or charges, and controls routing an incoming call to redirect the call to a live operator or to other equipment, or to outgoing lines to any desired destination.

Despite these prior art conferencing arrangements and schemes, there still remains a need in the art of providing services to call-in callers requesting services for a conferencing arrangement that better assists the call-in caller to provide requested services, protects the caller from utilizing the offered services too frequently, blocks unwanted calls, provides controls against credit card and other form of payment fraud and, when billing is involved, provides more efficient payment authorization and billing arrangements.

II. SUMMARY OF THE PRESENT INVENTION

According to the principles of the present invention, the caller to a service bureau can make informed choices as to the service representative they seek. More particularly, they make informed choices as to the number of service representatives they wish to assist them. It is an object, then, of the present invention, to improve services to call-in callers of a consultation network service or the like such as the Yellow Pages Psychic Network service.

Also, service representatives may make informed choices as to how they believe they may best serve the call-in public. For example, in response to qualification polling, the service representative may indicate their inclination to join in a multiple service representative call or identify certain pre-determined criteria for the caller or other conferee. It is an object, then, of the present invention to provide a method and apparatus that improves service provided by service representatives by permitting the service representatives to make informed choices about the calls and conferees of a group conference.

Additionally, the caller has in the past sometimes fooled the system and service provider into performing inappropriate actions such as extending credit or permitting a caller to access service beyond a reasonable level of service. Consequently, it is a further object of the present invention to provide for call limiting, call blocking and fraud control features.

Finally, to improve payment authorization and billing procedures for such services if such services are provided for a fee, it is a further object of the present invention to provide for multiple forms of payment and reward those that are more credit worthy automatically with discount fees if appropriate.

In accordance with these principles and objects, a caller and user of the present invention dials an 800 or 900 telephone number representing a desired service, for example, the Yellow Pages Psychic Network service. The caller can call a special telephone number dedicated to plural service representative service, for example, a psychic twins service. Alternatively, the caller can dial a number for the service and receive via an audio response unit (ARU) certain cues to service selection. The ARU requires responses and entries entered via a touch-tone (dual tone multi-frequency) keypad or accepts voice requests and inputs at a voice recognition apparatus or related device. As a consequence the caller can identify a request for a "psychic twins" call or, in other words, multiple service representatives to assist them. (Service representative selection criteria that may be entered as well include, for example, a request for a service representative sharing a particular sign of the Zodiac or identify themselves to be associated with a selected sign).

The present invention also involves the process of blocking a call or limiting the number and duration of calls for protecting the service user of excesses and to prevent against fraud or other service abuse. When the service involves a fee, the present invention suggests the implementation of certain payment fraud control features. The caller identifies themselves to the apparatus and enters such information as credit card number for billing information. According to such a feature of the present invention, the caller is screened by the service bureau in an automatic manner. Through queries of the caller, the identity of the caller is determined and cross-checked against positive and negative databases. A parameter such as 100 call/minutes per month or 2 calls per day can be established in the system in memory and used to gauge whether the caller is using the service too frequently. In this manner, the number and or duration of the calls may be intentionally limited. Also, the caller can be asked to enter the first several digital of their home address, apartment number and/or zip code through their telephone keypad for transmitting a bill and that address portion and/or zip code can be matched against credit card or other pre-stored data as a security check. If there is no match and the caller is trying to trick the system, then the call is intentionally blocked.

The present invention comprises automatic number identification information and accepts the telephone number of the calling party determined via the automatic number identification equipment into memory. The system of the present invention checks the caller's number determined via the ANI equipment against a manually entered telephone number in response to a telephone number request and/or against internal and external negative databases. If the ANI determined number does not match the caller entered telephone number or any of the negative databases (of unwanted telephone call sources) indicates a match, the call is automatically blocked.

Moreover, according to the present invention, the identities of service representatives requested by the caller are determined in response to the caller. In particular, service representative data may be predetermined and stored in memory from a log-on process the service representative typically performs to identify to the network that they are prepared to accept calls from the network.

In response to the caller input information and the service representative input information, a single incoming caller may be, if they so request, simultaneously connected to a plurality of predetermined service representatives. During the connecting process, the dialed telephone number and service representative conferee data may be provided to the caller, for example by scrolling a single line alphanumeric display.

Psychics of the Yellow Pages Psychic Network service are advised not to maintain caller identification services or personal databases for clients. However, in other applications of the present invention such as suicide hot-line applications, service representatives should have as much information about the caller as possible. Consequently, service representatives according to the principles of the present invention may be provided with a one line alphanumeric display and data scrolled to them showing caller name, other service representative name, location and the like. If the service representative is provided a more sophisticated display arrangement such as a cathode ray tube display, a network controller can forward any information it knows about the caller to the plurality of service representative conferees and identify for each service representative conferee the identities and data about the other service representative conferees and the caller. Moreover, at the conclusion of a call or whenever billing information is finalized, callers may be offered the opportunity to pay by major credit card, to prepare a "draft" or "electronic check" or pay by debit card on their bank to pay for the service automatically. The user may enter such information via their telephone keypad. Payment authorization, for example, from a credit agency or bank is preferably obtained in real time via a secure communications link with the credit agency or bank. Former antiquated billing systems may be upgraded to such more sophisticated billing arrangements by adding a controller controlled modem to such systems. Also, preferably discounts may be immediately and automatically provided when such forms of payment are used to encourage use of the more credit worthy arrangements such as guaranteed credit cards, debit cards, electronic checks and drafts and the like after such form of payment is authorized in real time via return communication via the modem.

Consequently, according to the present invention, two or more service representatives may be automatically and simultaneously associated with a single call-in caller requesting service and the caller can be predetermined to receive the best possible service the service bureau is able to give and, moreover, provide service that meets the needs of the caller and is matched to the abilities of the service representatives. Parameters may be established to limit calls in such systems so that callers do not overuse the services provided by the system. Finally, if billing is provided in such a system, the system may be made more credit conscious and efficient by accepting alternate methods of payment. The objects and features of the present invention will be best understood from the following detailed discussion of the present invention wherein the first numeral of a reference number indicates the number of the first figure the element first appears, and every effort is made to describe alternative embodiments by which the feature may be provided. While a detailed illustrative embodiment of the present invention is disclosed herein related to a psychic counseling network service such as the Yellow Pages Psychic Network service, other consultative services and other services may come to mind, such as, psychological counseling medical counseling, sex therapeutic counseling, religious advice, dating services, chat lines, so-called suicide hot line, adult entertainment lines and other counseling services, some for a fee and some provided by not-for-profit organizations. Clearly, elements in accordance with the present invention may be embodied in a wide variety of forms, some of which may be quite different from those of the disclosed embodiment. Consequently, the specific structural and functional details disclosed herein are merely representative; yet, in that regard, they are deemed to afford a preferred embodiment for purposes of disclosure and provide a basis for the claims herein which define the scope of the present invention.

DETAILED DESCRIPTION

Figure 1:
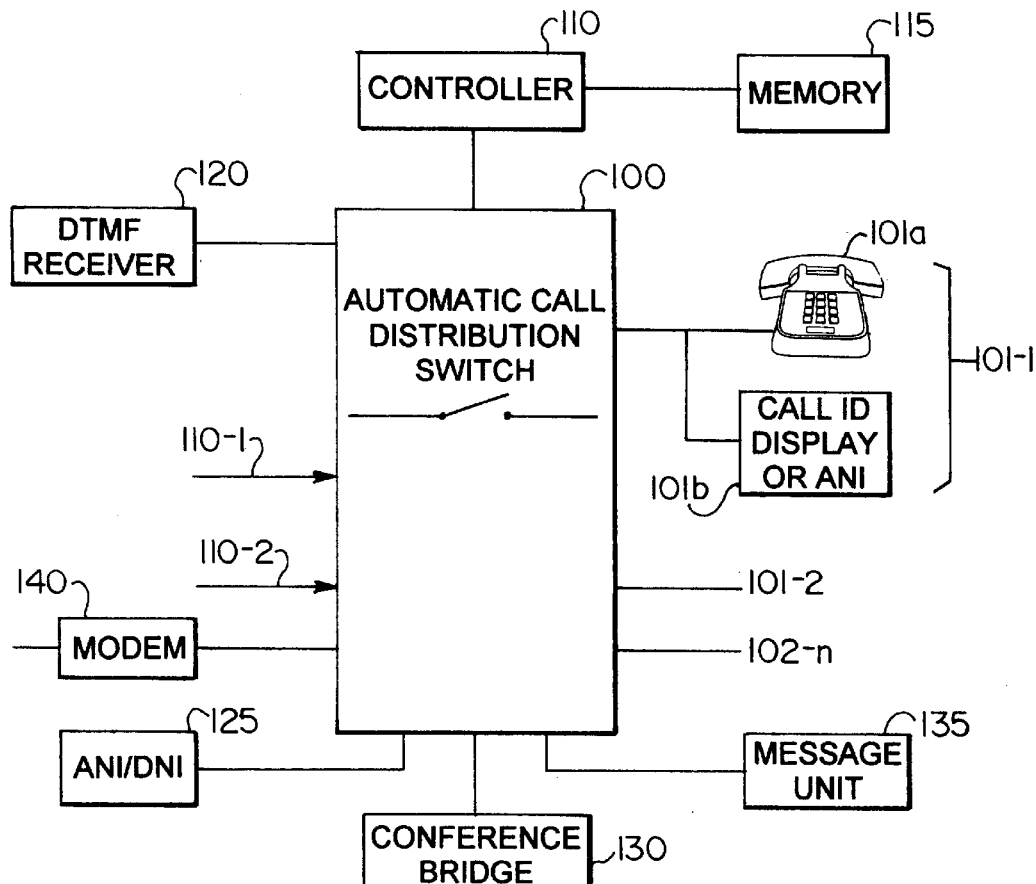
FIG. 1 provides an overall block schematic diagram of an automatic call distribution system including a controller and switch which is representative for providing the group conferencing feature of the present invention.

Referring now to FIG. 1, there is shown a representative automatic call distribution system programmed to operate in accordance with the present invention. Such automatic call distribution systems may vary from manufacturer to manufacturer but typically, according to the present invention, are susceptible to common control via a controller 110 having an associated memory 115 for storage of control programs and data. The automatic call distributor typically comprises a switch 100 to which may be connected service representatives operating from service representative positions 101-1 through 102-n. Service representative position 101a may be a remote dial-up terminal; that is the ACD 100 must call the service representative terminal which may comprise a caller identification display. Alternatively, the service representative position may be a conventional service representative position 101-2 comprising an operator headset, a cathode ray tube display, a computer system and automatic number identification/name display. Such a service representative operates as an extension line of the automatic call distributor. A service representative signifies their ability to provide service via the log-in procedure flowchart of FIG. 2 as will be further described herein. The call-in caller requesting service is handled according to the flowchart of FIG. 3 as will be further described herein.

There typically exist a plurality of service circuits connected to the switch that provide various signaling, data input, data output, conferencing and other services. These include, but are not limited to including a dual tone multi-frequency (DTMF) receiver and decoder 120, automatic number identification (ANI), dialed number identification (DNI) circuitry 125, audio response (message) unit 135, conference bridge circuit 130 and modulator/demodulator circuitry (MODEM) 140. One or more of each type of circuit are typically provided and the number depends on their frequency of use. Each is called into play by the controller 110 in accordance with call processing and control programs stored in memory 115. One control program residing in memory 115 is a real time of day, day, month and year clock which must be maintained accurate, for example, by periodic satellite update and must be preserved even in the event of a local power loss to the system. Another program is a translation program that may be needed to translate a called telephone number to an advertising source or to translate a psychic service representative's extension number to a remote telephone number for remote dialing if required. The DTMF receiver and decoder 120 is especially important for receiving such information as zip code, address, credit card number, band account number, name input, command and signals to the system or the present invention for caller control and system control to the extent of at least providing service, call blocking call limiting, fraud control and payment and billing features. The audio response (message) unit 135 preferably comprises audible announcement and connection to DTMF receiver/decoder 120 to query the user and receive and decode input data entered via telephone keypad in response to an announcement query. In future embodiments, such DTMF and other input circuits 120 may be replaced by speech recognition and other automatic input devices that have been recently developed. MODEM 140 under control of controller 110 automatically forwards form of payment data to a credit agency or bank and receives authorization in real time for the payment or charge to an account. Modem 140 may comprise a network data mover (NDM) modem or a remote job entry (RJE) modem. Later, after the call is completed, modem 140 communicates call charge information to a billing agency.

Call-in callers call-in on lines 110-1 and 110-2 which are representative of lines/trunks connecting the depicted automatic call distributor to a telephone switching center. A number of different telephone numbers identified to the lines/trunks at a telephone central office may be used to identify the source of advertising or other means the caller was advised of the existence of the service. Typically, signaling information is provided in advance of a call on the same or a different line. The signaling information includes the address of the calling party and may include the called address. The dialed number identification, automatic number identification (ANI/DNI) unit 125 identifies the dialed number for, for example, identifying the advertising or other means by which the caller learned of the service. ANI/DNI unit 125 also indicates the calling telephone umber for comparison with telephone number requested of the user for telephone keypad entry once the call has begun or for comparison with negative databases as will be further described herein.

Briefly and according to one embodiment of the present invention, an 800 or 900 telephone number may be used, for example, for a psychic network service for connecting a single service representative in an available service representative queue to a new caller. A second telephone number may be used for identifying a psychic twins service, where two service representatives are connected simultaneously to a caller via a dual representative service representative availability queue. A third number is used for a three service representative call and so on. In a preferred embodiment according to the present invention, the call-in caller is handled according to the call processing algorithm provided by FIG. 3 which will be described subsequently herein.

The conference bridge 130 may comprise automatic dialing equipment for dialing a telephone number for a service representative or automatic dialing circuits may be separately provided (not shown). Of course, in accordance with the present invention, plural service representatives are simultaneously connected to a caller desiring such service and automatic dialing circuits may or may not be needed in a particular conference call depending on whether the service representative is directly connected to the automatic all distributor 100 as an extension or must be "dialed-up." Ringing circuits (not shown) transmit ringing signals toward a service representative, but, according to the present invention, audible ringing is not provided the caller: the service representative is connected at the time the service representative goes off hook.

Figure 2:
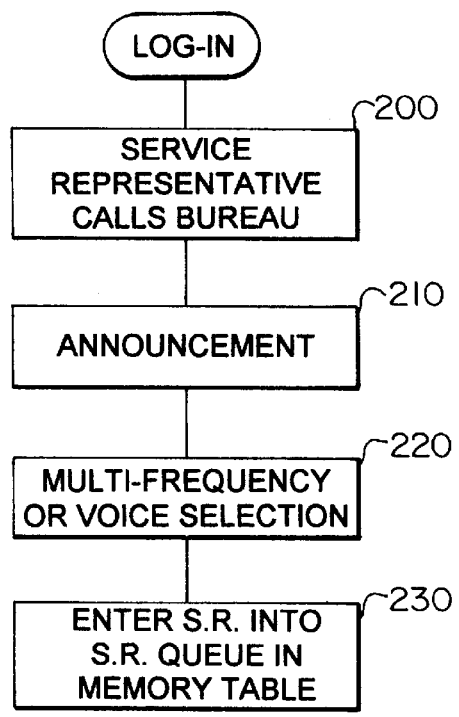
FIG. 2 provides a flowchart of the log-in process a service representative may follow in order to define their criteria to the controller for storage in memory of the automatic call distribution system of FIG. 1 for handling call-in callers requesting services.

Now referring to FIG. 2, a service representative log-in flowchart is provided for describing the sequence of operations controlled by controller 110 in actuating and entering a service representative into a service representative availability queue. At step 200, a service representative calls the service bureau and indicates their availability to provider service. Of course, if the service representative is directly connected to the switch 100, the calling service representative may need only to pick up their phone connected, for example, to a private dedicated line. Whether or not the calling service representative is connected via a dedicated line, their extension or telephone number is automatically recognized by controller 110, for example, through automatic number identification circuit 125.

Now an audio response unit 135 is connected to the service representative at step 210. Typically, at this time, a time of day record is made in memory 115 vial controller 110 of the time and date the service representative has offered to being servicing callers. The service representative receives a programmed announcement at step 210, for example, asking the service representative to identify for recording in memory 115 certain choices and preferences. For example, the psychic twins network is currently negotiating with a pair of psychic twins who may prefer to offer services together to a call-in caller. In other words service representative A may predetermine to only be connected in a psychic dual conferencing call with their predetermined twin service representative B. Other preferences may be predetermined or entered for the first time, such as the service representative's birth sign of the Zodiac, name, address, billing rate or other information preferably automatically via their telephone keypad or via voice recognition. In an alternative embodiment, the service representative is equipped with a cathode ray terminal, printer or other display and full keyboard permitting written query and response and so the "announcement" step 210 may refer to a written or displayed announcement. However, in a preferred embodiment, a typical announcement provided by either may comprise: Press 1 if you wish to serve one call at a time by yourself; Press 2 if you wish to confer with a second conferee on each incoming call; press 3 if you wish to confer with two other conferees on each incoming call requesting service and so on. Now step 220 is reached and steps 210 and 220 repeated until long-in is complete. For example, once the response or series of responses to a query, for example, the numbers 1 or 2 or 12 indicating the 12th sign of the Zodiac or alphabetic input via keypad and decoding is registered by DTMF receiver 120 and reported to controller 110, the ARU 135 may provide a validity check for the entered data and voice feedback of the selection and then, the ARU 135 may further request, "Do you have a preference for the second conferee? If so, enter by pressing keys of the keypad the first several letters of the preferred conferee's last name." Of course, a twin would enter their own last name and their twin could be immediately identified via memory look-up at memory 115. Again, voice confirmation or other confirmation/feedback that the choice is accepted may be provided and error algorithms likewise provided to correct an erroneous choice made by a service representative as necessary.

In the log-in process of FIG. 2, the various announcements and responses of step 210, 220 can be varied depending on the desired service to be performed. Moreover, the result may vary. In one scenario, there may be an availability queue of available service representatives willing to confer singly with a caller or with other conferees. In other words, the service representative may be willing to accept any request for services. In other embodiments, there may be availability queues formed in memory of 115 for single service representative calls, dual or twins calls, triplets or three service representative calls and so on. Or there may be a combination of such queues depending on the embodiment. Consequently, in its simplest embodiment the present invention involves the service representative logging in to a dual service representative availability queue such that on receiving a call to a special dual service representative telephone number, the next two service representatives that are presently available in the dual service representative availability queue are automatically and practically simultaneously connected to the caller.

The result of the log-in process is identified as step 230, that is, the service representative is entered into memory 115 in one or more service representative availability queues as a memory table. Of course, as a service representative takes a call and is tied up with a caller and maybe one or more other service representative conferees, the table records there "busy" state as signaled by the controller 110. Moreover, the service representative has signaled and recorded their preferences for the type of cal they are willing to handle (for example, by themselves, with one other service representative conferee and the like) and certain preferences, for example, their own sign of the zodiac, their day, month, year of birth, sex or other information useful for arranging a call. Some or all of this information depending on the service offered may be preserved in memory 115. Over time, the number of calls handled by the service representative, the type of calls, the callers' identities, caller preferences and the like may be logged in and associated with the service representative to assist in providing better service and in providing salary or other compensation to the service representatives.

Figure 3:
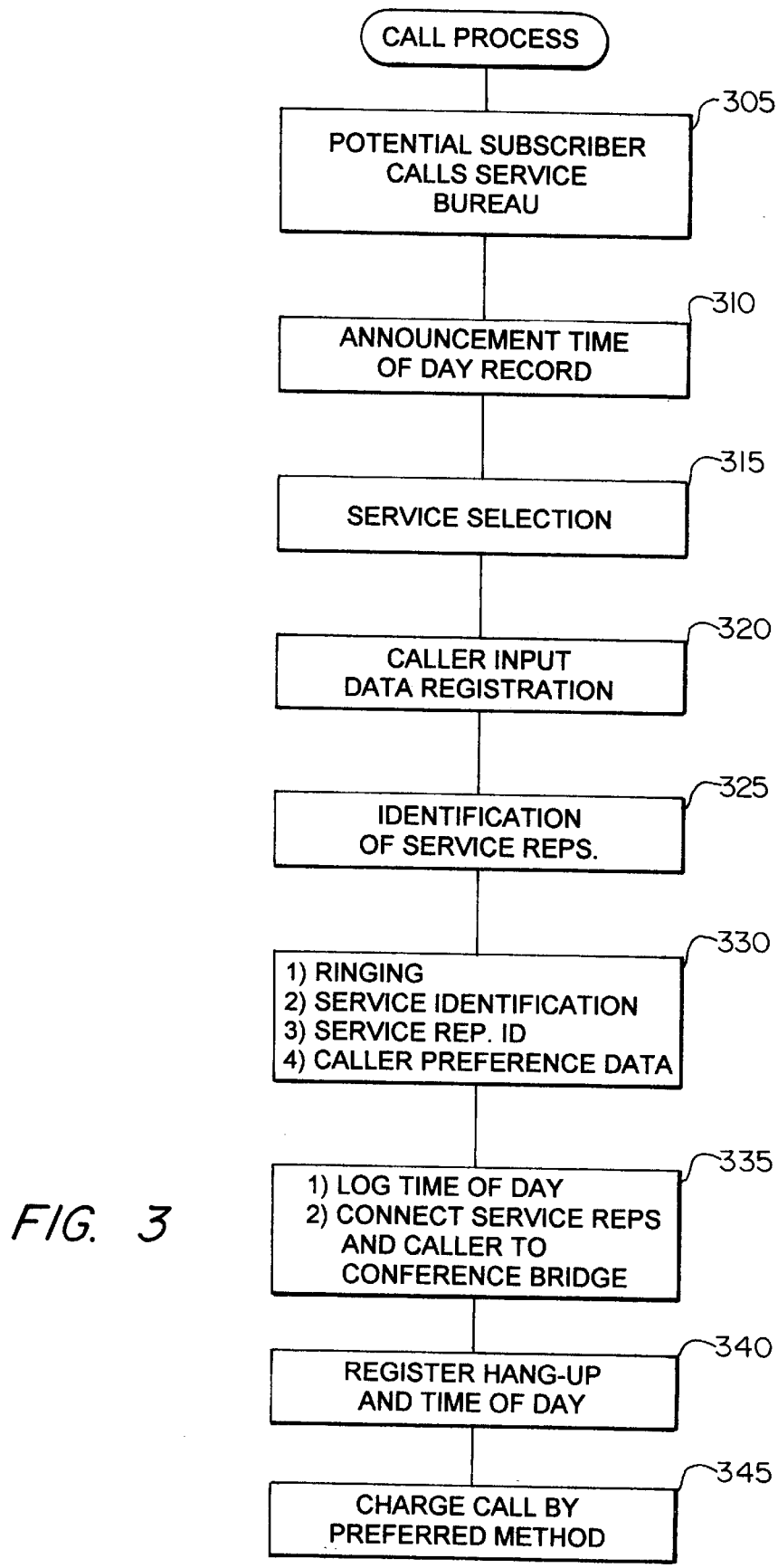
FIG. 3 provides a flowchart of the plural service representative call of the present invention whereby a call-in requestor of services may define for themselves certain parameters with the group conference call is to follow as the representative automatic call distribution system of FIG. 1 proceeds to connect two or more service representatives to the same caller.

Now referring to FIG. 3, there is shown a flowchart for call processing a plural service representative call to a service bureau. At step 305, a potential subscriber to the psychic network service calls the 800 or 900 telephone number for the service bureau on line 110-1 or series of trunks 110-1. A second line or series of trunks may be separately provided for twins service. In such an instance, the caller may be immediately passed to step 320 and their input data registered including, but not limited to, their calling telephone number, address and billing information.

According to the present invention, call limiting, call blocking and fraud control checking is now performed automatically. For example, arbitrary call limiting criteria may be established such as two calls per day, 40 minutes per day, 50 minutes per week or 85 call minutes per month for calling services to protect the caller against excess usage and billing. The caller is looked up in a database to determine how frequently and, for each call, how long the caller has been connected to determine if call limiting criteria, call duration, number of calls or both, is exceeded. The call limiting criteria being met, the caller may receive a message thanking them for their past calls but potentially blocking or limiting the duration of the present call. In regards to call blocking due to input data and certain negative databases matching, the telephone number, first several digits of the address or apartment number and/or zip code of the caller requested to be entered by way of telephone keypad may be matched against the calling telephone number (obtained via ANI) and/or credit card data and so a security breach preidentified. The comparison of the user entered zip code and/or first several digits of a street address or apartment number against credit card data downloaded or prestored from a credit agency or bank may be referred to herein as an address verification system (AVS). The caller may be asked to explain the discrepancy and/or the call blocked. The calling numbers (obtained via ANI and by caller entry) can be checked against each other and against telephone number negative databases identifying pay phones, prisons and other institutions or locations of telephones from which calls may be blocked at switch 100. A voiceprint of the caller's voice may be recorded via message unit 135, converted to digital form and compared against a voiceprint database to insure the validity of the identity of the caller. The caller's name may be spelled into the system via a telephone keypad, compared against a card-holder or account name as a security check. At least, via AVS, the address of the caller, entered by telephone keypad, can be matched against the address of the card holder or on an account pre-stored and downloaded from a credit agency or bank. In an alternative embodiment, a non-psychic service representative may assist or supplement an automated system or replace an automated system in regards to call limiting, call blocking, fraud control, collecting form of payment information and obtaining payment authorization.

At step 325, the caller is identified to be served by service representatives A and B and immediately connected at step 330 to the identified service representatives from the availability queue for dual service representative calls. This is the initial embodiment of the present invention. Once call blocking, call limiting and fraud control criteria are met, a single caller is immediately connected and served by the next two service representatives in the dual service representative availability queue.

In a further preferred embodiment of the present invention, steps 310 and 315 are repeated until the caller "logs in" in a similar manner to the way the service representative logs in as per FIG. 2. For example, at announcement step 310, a welcome announcement to the psychic network service may play. If the service representative queue is relatively full, announcement may indicate that the caller's call is important and will be delayed momentarily. Based on controller calculated average call durations and other queuing theory calculations, the controller 110 may even indicate that the waiting time may be expected to be so many seconds and, in the meanwhile, will begin to record certain service and service representative preference information. For example, as before, the caller may log in their month day and year of birth, their sex and their service preference (one, two, three or more service representative conferees).

As steps 310 and 315 are repeated, the controller variously calls into play the ARU 135, ANI 125 and DTMF receiver/decoder 120 as necessary. The controller may consult a database to determine, among other things, how the caller has paid in the past to determine billing arrangements, has used the service before, what preferences and data was accumulated at that time and bring such useful data to this call to active memory.

Once the call is accepted and the caller has logged in, of course, their input data is registered into active memory 115 at step 320. The registered data may include, among other things, name, address, zip code, telephone number, credit card type and number, bank name and account number and billing data, service preference, and data that may be used to match with service representative data. For example, the caller's sign of the Zodiac, determined from birth data input or entered separately may be matched with similar psychic service representative information before the call is initiated.

Identification of service representatives step 325 then may be as simple as taking the next available service representative in an availability queue and associating them with a call-in caller. In a dual service representative call, the next two available service representatives are determined from the availability queue for a call and so on. The step can be more complicated as two psychic twins may be required to be identified and selected. Other criteria may include sex, sign of the Zodiac and other preference data. In all such criteria selection and matching or preferences, step 325 is crucial to obtaining the best service for a particular call-in caller. The trade-off is that there may not be as many available service representatives having desired criteria, and the delay in arranging a call may be lengthened or a particular call may be impossible to accomplish at a given time. Announcement 310 may be adaptively used to describe for the caller the real choices the caller is able to make at a particular time under control of controller 110. The caller may be offered additional choices within the same network, or through prior arrangement with another psychic counseling network service, the caller may be transferred to an available psychic representative of another psychic network service and receive service there.

The call processing program now proceeds to step 330 once the plural service representatives are identified for a given call-in caller who has been properly matched. The particular steps of step 330 include 1) ringing simultaneously the two or more service representatives' lines/trunks 2) identifying the service type 3) identifying the other service representative conferee(s) as appropriate and 4) identifying caller information including their Zodiac sign and the like. Service representatives are requested not to have ANI service or a display. However, if the service representative has an appropriate display, the caller can be identified by telephone number origin of caller and any particular information already known about the caller may be displayed as step 4). At the very least, a one line alphanumeric display may scroll through service representative conferee identity data and the caller identity, if determinable. If the service representative has a more capable display, the service representative may be provided with all caller-preference, service and service representative conferee data via a preparatory signaling data link during ringing. The data may be temporarily stored at terminal 101a and then displayed or displayed before the service representative takes the call by going off hook.

Once the service representative goes off hook, the caller will be billed for the call. Consequently, at step 335, all caller and service representative data is logged in along with time of day and date for calculating call duration in minutes and for billing and service representative compensation data logging. Specifically, the caller is billed for the duration from the first service representative going off hook until the last service representative goes on hook. Individual time logs are maintained for the caller (call duration) and each service representative (service duration). For example, when the first service representative hangs up, the system will update the database with the first service representative's connect time, time of day and the date. When the second or final service representative hangs up, the caller is billed for the total call time and the second service representative's connect time, time of day and date are logged as necessary.

The two or more service representatives and caller are connected to a conference bridge 130 if necessary before or after the step 330. Conference bridge 130 may be required at step 335, for example, or may be necessary for automatically dialing via an included automatic dialer a conferee remote service representative. Also, a conference bridge is known to improve transmission quality by providing amplification ad isolation for multiple conferees. A conference bridge 130 is not needed for a conference of just three conferees for transmission purposes but is recommended for four or more.

Once the conferees (including the caller) have completed a call, step 340 is entered. On-hook conditions must be registered by the controller 110 and the time-of-day regarded in order to calculate the duration of the call. Each of the service representatives are returned to their respective availability queues until they choose to log off by following a log-off process complimentary to the log-in process of FIG. 2. Once a service representative logs in, the controller 110 anticipates that the next call to the service bureau is a log-off call and will provide an appropriate sequence of announcements and obtain response to log off. The time of day may be regarded to determine how long the service representative has been on the job.

If the counseling service is provided for a fee, it is anticipated according to the principles of the present invention that callers may be offered a variety of ways to pay for services offered. Some of the methods of payment may be more credit worthy than others. Such more credit worthy arrangements may include debit card, bank check or draft or major credit cards. A caller to the present system in response to a request via ARU unit 135 enters their preferred form of payment. A caller may receive preauthorization using these credit arrangements in real time, even prior to the counseling service and, consequently, make realize a discount according to the present invention which can induce the caller to use the method of payment that is desired by the service vendor. Payment method and billing arrangements are typically agreed upon after the call limiting, call blocking and fraud control features described above and may be agreed upon in advance of the call or prior to its conclusion. Preferably, such arrangements are agreed upon automatically by using message unit 135 and data input 120 as described above where MODEM 140 is used to obtain the payment from a bank or credit agency.

Figure 4:
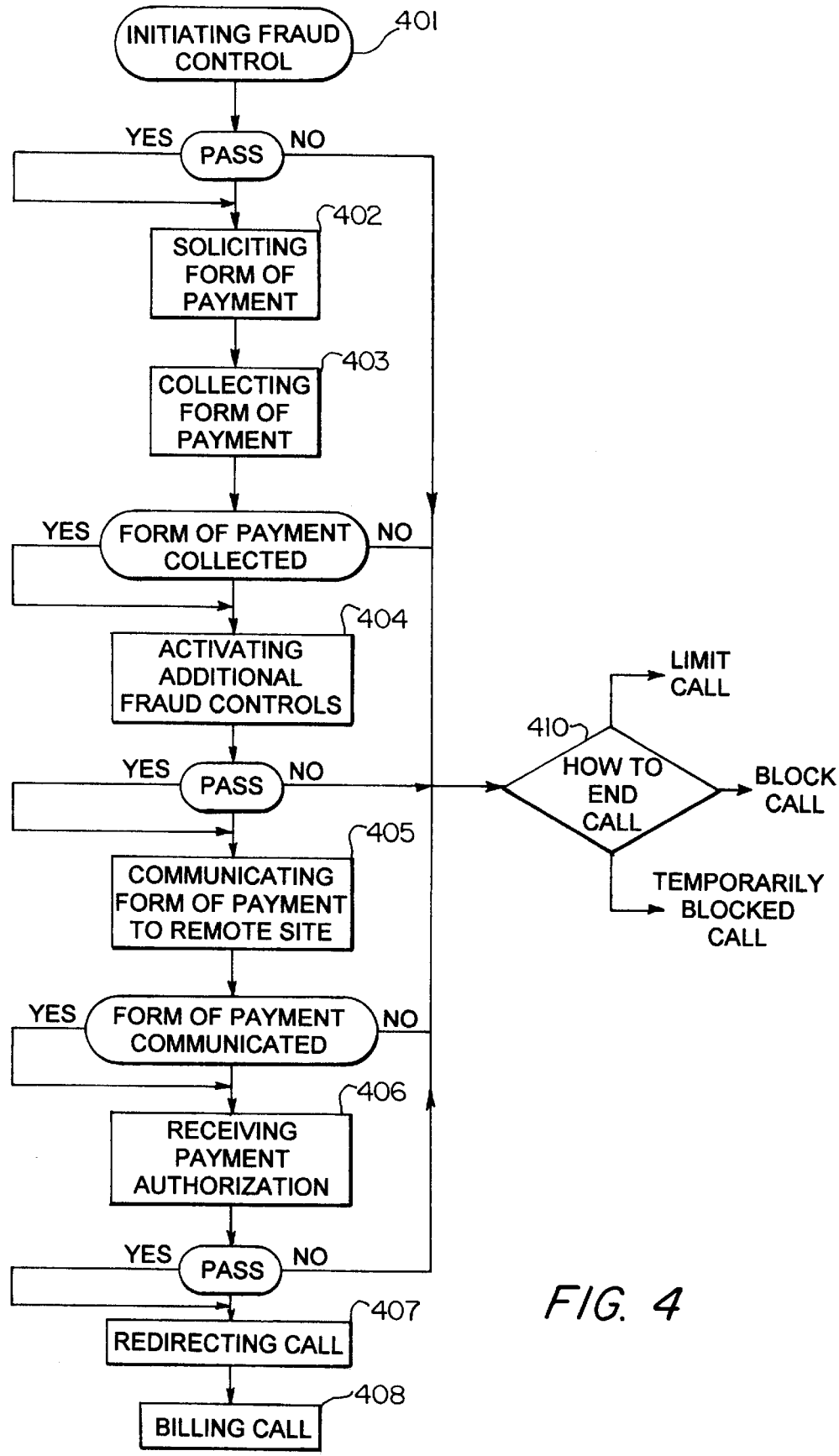
FIG. 4 provides a flowchart of the billing scheme of the present invention whereby after a call-in requester of services calls the toll-free number, he is subject to fraud control devices that ensure that he is a legitimate caller who hasn't exceeded his allowed number of calls or allowed time duration of calls during a specified period of time. The billing scheme activates other devices to ensure the call-in caller is credit worthy and if approval is given, the call-in caller is redirected to at least one live psychic and billed from the time of connection to the live psychic.

FIG. 4 shows a flow diagram of a real-time billing system in accordance with the principles of the present invention. Block 401 activates the initial fraud controls which may include limiting the number and duration of calls made during a certain time period. For example, a caller may be limited to only two calls per day or two calls per week. The duration of the calls may be limited such that a caller is only allowed to speak with service representatives for a maximum of one hundred minutes per month, etc.

Another feature of the 401 initial fraud controls, is to verify that the caller's telephone number is not stored in a negative data bank of telephone numbers. Telephone numbers stored in this data base result from insufficient payment of a telephone bill or a credit card charge, or a caller's refusal of payment due to a disputed charge from a previous service representative telephone session. However, we are not limited by the above-mentioned negative data base satisfying the criteria mentioned above (storing telephone numbers having disputed charges or insufficient payments with respect to a service representative telephone session). The data base of the present system may be a shared data base, storing telephone numbers of callers who have credit problems with all types of telephone ordering/payment systems.

The present system further checks to ensure that calls are not made from locations in which the telephone number cannot be forwarded to a Caller ID or other device that displays the telephone number of the incoming call. In particular, certain parts of the United States cannot read ANI's and these numbers are detected in the initial fraud controls, 401. The system can also be designed to detected calls from particular institutions and communication devices such as cellular telephones, numbers associated with a PBX system, governmental facilities, pay telephones, prisons, hospitals, etc.

Another feature of the initial fraud controls, 401 is to verify that the caller is calling from a location that matches the telephone number from a displayed ANI. Once a caller calls, the system prompts the caller to enter his telephone number. If the entered telephone number does not match the number forwarded by the ANI, the caller may be disconnected or the caller may be given other chance to reenter the correct telephone number. The above mentioned initial fraud controls are illustrative examples. Other fraud controls will be apparent to those skilled in the art, thus the invention is not limited to the fraud controls described above. In general, the system can be designed to prevent any unwanted telephone numbers from entering the system.

Calls that fail the initial fraud controls, 401 are forwarded to block 410 wherein the call is processed to determine what the next course of action will be. Calls can either be blocked, temporarily blocked or limited. Blocked calls will be permanently prohibited from connection with an operator, and a message may be associated with blocked calls that ask the caller to stop calling the number because the number has been blocked. Examples of blocked calls include telephone numbers located in a negative database or calls where an ANI cannot be forwarded. Limited calling prohibits a caller who has exceeded the allotted number of calls or exceeded the allotted duration (in minutes, hour, or days) of calls during a certain calling period. The limitations on a given caller may be removed once the caller has satisfied the criteria for removing the limitation. Temporarily blocked calls include calls where a telephone number requested by an operator does not match an ANI number displayed. The caller may be able to reenter the correct telephone number or may be allowed to call again to correctly enter his telephone number. Therefore, the caller is merely temporarily blocked from being connected to a service representative. When anyone of the call limiting, call blocking, or temporarily call blocking features is activated the call is disconnected.

If the call successfully passes the initial fraud controls, 401 the call then advances to block 402 which solicits the from of payment used to pay for the call to a service representative. In step 402, the caller is prompted by, for example, a computer activated voice, or by an operator (a non-service representative) to indicate the form of payment information the caller wishes to use. The form of payment can either be cash, debit cards, electronic draft or check, credit, major credit card, and the like. The operator or computer activated voice may offer the caller a discount if the form of payment selected by the caller is convenient to the billing system. A further discount may be given if the caller is a frequent caller who has not exceeded his allowance of prescribed calls. Any other form of preferable treatment may be initiated. In the exemplary embodiment described in FIG. 4, the caller provides the form of payment information to the operator or inputs this information via a telephone keypad. The caller could be requested to enter or supply such information as the credit or debit card numbers, expiration date of the card, address including zip code, billing address, date of birth, etc. If the form of payment is not successfully communicated to the operator or entered by the caller via his telephone keypad, the call is disconnected. The caller may be temporarily blocked and given another chance to enter the correct information. However, the caller may be blocked from calling the system again.

If the information is successfully communicated or entered, the information is forwarded to block 404, where additional fraud controls are implemented. These additional fraud controls may, for example, include comparing the information given by the caller to the information stored in a data bank of information related to each caller, verifying that the caller's charge card or debit card number has not been in a negative data base for delinquent payment, or verifying that the caller has not exceeded his monthly/weekly allocation of calls or exceeded the time allowance for a certain period of time with respect to his credit card or debit card.

If calls fail the additional fraud controls, the calls are forwarded to block 410 where they can be blocked, temporarily blocked, or limited. Blocked calls include calls where the credit card of debit card has expired or is invalid. Limited calls include calls where a credit card or a debit card exceeds the monthly/weekly allocations of calls or exceeds the time allowance for a certain period of time. Temporarily blocked calls include calls wherein the zip code or other information supplied by the caller does not match information stored in a data base. Moreover, the system can be designed such that calls classified as blocked calls can also be classified as temporarily blocked calls if the system allows a caller to supply information such as the correct expiration date of a charge card. Moreover, if the caller is allowed to make payment to a lending institution in order to validate the credit or debit card, a call can be classified as temporarily blocked.

If the call passes the additional fraud controls, the form of payment information is forwarded to a remote site for authorization. Remote sites used for authorization may, for example, include a credit bureau, a banking institution, a third party biller, or the like. The system of the instant invention may also be implemented using an in-house billing scheme.

After the form of payment is communicated to a remote site for verification 405, the information is processed and an approval or denial is forwarded back to the system, 406. If the remote site authorizes the call, the call is forwarded to a service representative such as a psychic. If the call is not authorized, the call is either blocked or temporarily blocked until information regarding the credit bureau or the banking institution is settled by the caller.

At block 407 the call is redirected to a service representative and at this point, the billing processes begin as shown in block 408. The call is billed from the time the call is redirected to one or more service representatives and ends when the last service representative hangs up. The caller is billed in real time for only the actual minutes that the caller speaks with the service representative.

Prior to step 345 and using MODEM 140 in real time and prior to or during the call, the caller's credit card or other form of payment such as debit card or electronic check may be verified with a named bank or credit card agency. The caller enters their bank name, checking account number, card type, card number, debit card number by telephone keypad entry, a translation program identifies the telephone of the bank, credit bureau or agency and through an automatic upload/download receives payment authorization via modem 140. When the call is completed, controller 110 via MODEM 140 forwards the actual charge data to the credit agency or bank for real time debit of the caller's account. An operator may assist in collecting form of payment information prior to connection of the call in place of or as a supplement to automated means.

In the very near future, callers may be equipped with video cameras and video conferencing with service representatives may become more available. The present invention is intended to be adaptable to providing video conferencing services. Moreover, the service representatives may not necessarily need to depend on central controller 110 for database maintenance services regarding caller and service representative data; such data may be maintained and updated in personal computers at the service representative's premises. Such other modifications and enhancements to the present invention may be adaptively made for providing other services than that described such as medical counseling, suicide hot-line and other services. Any patents or publications referenced above should be deemed to be incorporated by reference as to their entire subject matter should one believe it relevant to obtain details from such sources for explanations of related arrangements and how they may be employed to advantage in the present invention. The present invention should only be deemed to be limited in scope by the claims which follow.

We claim:

1. A method of billing a call between a service representative and a caller comprising the steps of:

obtaining calling telephone number via automatic number identification means;

blocking said call if previous calls from said calling number to called number within a first predetermined period of time are over a first predetermined limit;

soliciting form of payment information before the call begins or during the call;

collecting form of payment data in real time;

said form of payment including at least one of cash, charge and a substitute therefor;

communicating said form of payment data to a remote site;

receiving payment authorization from said remote site via MODEM before the call is completed;

blocking said call if previous calls within a second predetermined period of time to said called number using said payment information are over a second predetermined limit;

redirecting the call to a live operator; and transmitting call charge data associated with the redirected call to said remote site via MODEM at completion of the call.

2. A method of billing a call as recited in claim 1, wherein a discount is given responsive to a selection of a form of payment before said call begins.

3. A method of billing a call as recited in claim 1, wherein said step of transmitting call charge data to said remote site comprises transmitting call charge data to a banking institution.

4. A method of billing a call as recited in claim 1, wherein said step of transmitting call charge data to said remote site comprises transmitting call charge data to a credit card agency.

5. A method of billing a call as recited in claim 1, wherein said step of collecting form of payment data in real time includes at least one of collecting debit card account, bank checking account, bank draft account and major credit card account information.

6. A method of billing a call as recited n claim 1, wherein said step of collecting form of payment further includes pre-paid blocks of time.

7. A method of billing a call as recited in claim 1, wherein said step of collecting form of payment further includes direct telephone billing.

8. A method of billing a call as recited in claim 1, wherein said step of collecting form of payment further includes in house invoicing.

9. A method of billing a call as recited in claim 2, where a discount is further given responsive to frequent calling by said authorized caller.

10. A method of billing a call between a service representative and a caller comprising the steps of:

initiating preliminary fraud controls, said preliminary fraud controls comprising the steps of:

obtaining calling telephone number via automatic number identification means;

blocking said call if previous calls from said calling number within a first predetermined period of time are over a first predetermined limit;

soliciting form of payment information before the call begins;

activating additional fraud controls for caller information;

blocking said call if previous calls within a second predetermined period of time to said called number using said payment information are over a second predetermined limit;

redirecting the call to a live operator after the call passes the fraud controls; and real time billing said user based on the redirected call.

11. A method of billing as recited in claim 10, wherein said step of billing generates a bill at a per second rate.

12. A method of billing as recited in claim 10, wherein said step of activating fraud controls comprises the steps of:

verifying a user's street address; and verifying a user's city and state.

13. A method of billing as recited in claim 10, wherein said step of activating fraud controls comprises the step of:

permanently deleting users by blocking phone numbers of fraudulent users.

14. A method of billing as recited in claim 10, wherein said step of activating fraud controls comprises at least the step of permanently blocking credit card numbers and checking account numbers of fraudulent users.

15. A method of billing as recited in claim 10, wherein said step of activating fraud controls comprises the step of permanently blocking bank card numbers of fraudulent users.

16. A method of billing as recited in claim 10, wherein said step of activating fraud control comprises the step of limiting a set number of calls at least by per hour, per day, per week, and per month.

17. A method of billing a call among two more service representatives and a caller comprising the steps of:

initiating preliminary fraud controls, said preliminary fraud controls comprising the steps of:

obtaining calling telephone number via automatic number identification means;

blocking said call if previous calls from said calling number to called number within a first predetermined period of time are over a first predetermined limit;

soliciting form of payment information before the call begins or during the call;

collecting form of payment data in real time;

activating additional fraud controls for caller information;

blocking said call if previous calls within a second predetermined period of time to said called number using said payment information are over a second predetermined limit;

communicating said form of payment data to a remote site;

receiving payment authorization from said remote site via MODEM;

redirecting said caller to at least one service representative; and billing said user once redirected to said service representative.

18. A method of billing as recited in claim 1, further comprising the steps of:

determining whether said calling telephone number is in a database of fraudulent telephone numbers;

blocking said call if said calling telephone number is in said database.

19. A method of billing as recited in claim 10, said preliminary fraud controls further comprising the steps of:

determining whether said calling telephone number is in a database of fraudulent telephone numbers;

blocking said call if said calling telephone number is in said database.

20. A method of billing as recited in claim 17, said preliminary fraud controls further comprising the steps of:

determining whether said calling telephone number is in a database of fraudulent telephone numbers;

blocking said call if said calling telephone number is in said database.

21. A method of billing as recited in claim 1, further comprising the steps of:

determining whether said payment information is in a local database before communicating said payment authorization to said remote site;

terminating said call if said payment information is in said local database.

22. A method of billing as recited in claim 17, further comprising the steps of:

determining whether said payment information is in a local database before communicating said payment authorization to said remote site;

terminating said call if said payment information is in said local database.

* * * * *